(12) United States Patent
Jardak

(10) Patent No.: US 11,018,905 B2
(45) Date of Patent: May 25, 2021

(54) CHANNEL ESTIMATION FOR WIRELESS COMMUNICATION

(71) Applicant: Kabushiki Kaisha Toshiba, Minato-ku (JP)

(72) Inventor: Seifallah Jardak, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/664,275

(22) Filed: Oct. 25, 2019

(65) Prior Publication Data
US 2021/0126817 A1  Apr. 29, 2021

(51) Int. Cl.
*H04L 25/03* (2006.01)
*H04L 5/14* (2006.01)

(52) U.S. Cl.
CPC ............ *H04L 25/0328* (2013.01); *H04L 5/14* (2013.01); *H04L 25/03019* (2013.01); *H04L 25/03292* (2013.01)

(58) Field of Classification Search
CPC ..... H04L 25/0202; H04L 5/14; H04L 12/413; H04L 25/03165; H04L 5/143; H04B 1/56; H04B 1/123; H04B 1/48; H04B 1/62; H04B 1/16
USPC .................. 375/296, 343; 370/277
See application file for complete search history.

(56) References Cited

U.S. PATENT DOCUMENTS

| | | | | |
|---|---|---|---|---|
| 10,050,663 | B1* | 8/2018 | Ku | H04B 1/525 |
| 2004/0161065 | A1* | 8/2004 | Buckley | H04L 25/0224 |
| | | | | 375/350 |
| 2008/0130789 | A1* | 6/2008 | Copeland | H04L 25/03343 |
| | | | | 375/297 |
| 2012/0263078 | A1* | 10/2012 | Tung | H04B 7/15564 |
| | | | | 370/277 |
| 2016/0226653 | A1* | 8/2016 | Bharadia | H04B 1/525 |
| 2019/0268026 | A1* | 8/2019 | Liu | H03M 13/3927 |
| 2019/0268130 | A1* | 8/2019 | Fang | H04J 11/0023 |

FOREIGN PATENT DOCUMENTS

| | | |
|---|---|---|
| CN | 103166883 A | 6/2013 |
| CN | 109412640 A | 3/2019 |

OTHER PUBLICATIONS

Magnus Isaksson, et al., "A Comparative Analysis of Behavioral Models for RF Power Amplifiers" IEEE Transactions on Microwave Theory and Techniques, vol. 54, No. 1, Jan. 2006, pp. 348-359.

Lauri Anttila, et al., "Cancellation of Power Amplifier Induced Nonlinear Self-Interference in Full-Duplex Transceivers" 2013 Asilomar Conference on Signals, Systems and Computers, 2013, pp. 1193-1198.

Dinesh Bharadia, et al., "Full Duplex Radios" Proceedings of the ACM SIGCOMM 2013 conference on SIGCOMM, ACM, 2013, pp. 375-386.

Elsayed Ahmed, et al., "Self-Interference Cancellation with Nonlinear Distortion Suppression for Full-Duplex Systems" 2013 Asilomar Conference on Signals, Systems and Computers, 2013, pp. 1199-1203.

* cited by examiner

*Primary Examiner* — Khai Tran
(74) *Attorney, Agent, or Firm* — Oblon, McClelland, Maier & Neustadt, L.L.P.

(57) ABSTRACT

Signal cancellation is implemented by way of a non-linear filter model feeding to an FIR channel. Parameters defining each element are iteratively established, first by initially estimating the FIR channel then jointly estimating the two elements.

9 Claims, 6 Drawing Sheets

CHANNEL ESTIMATION FOR WIRELESS COMMUNICATION

FIELD

Embodiments disclosed herein relate to wireless communication and, particularly but not exclusively, to architectures involving cotemporaneous transmission and reception at a node.

BACKGROUND

Full Duplex (FD) is the simultaneous transmission and reception (STAR) of wireless signals on the same frequency at the same time and is still a relatively new technology. FD is being investigated for WiFi and other mobile phone applications by a number of technology companies.

In the following, embodiments will be described with reference to the drawings in which.

DETAILED DESCRIPTION

In general terms, an aspect disclosed herein provides a low-complexity approach to modelling and estimating a high order non-linear adaptive filter as two separate filters, resulting in fewer filter parameters and reduced processing time.

In general terms, an aspect disclosed herein provides an iterative adaptive filtering method to estimate a nonlinear parallel Hammerstein model cascaded with a linear FIR channel with fewer filter parameters and reduced computational cost.

In some embodiments, the method requires prior estimate of either the linear or nonlinear model to use as initial point for the iterative method. The last known model state can be used if the model varies slowly in time.

In some embodiments, the method can be used in combination with a conventional approach, wherein multiple models can be combined or iteratively estimated to realize a compromise between filtering complexity and number of iterations.

An embodiment provides a wireless communication apparatus, configured for full duplex operation, comprising a signal canceller operable to cancel an artefact of a locally transmitted signal on a received signal, the signal canceller comprising a nonlinear filter feeding to a linear finite impulse response, FIR, channel, each being configured by respective parameters, wherein the signal canceller is operable to iteratively establish said parameters from an initial condition by firstly estimating the parameters of the FIR channel and then jointly estimating the nonlinear filter parameters and the FIR channel parameters.

The initial condition may comprise an estimate of parameters based on recent operation of the apparatus. A store may be provided for storing parameters for future use as an initial condition.

The non-linear filter may comprise a Hammerstein model. The Hammerstein model may comprises a parallel Hammerstein model.

An embodiment provides a method of cancelling an artefact of a transmitted signal on a received signal in a full duplex system, the method comprising establishing a non-linear filter model feeding to a FIR channel, each being configured by respective parameters, and iteratively establishing said parameters from an initial condition by firstly estimating the parameters of the FIR channel and then jointly estimating the nonlinear filter parameters and the FIR channel parameters.

The initial condition may comprise basing an estimate of parameters on recent operation. The method may comprise storing parameters for future use as an initial condition.

Aspects of embodiments disclosed herein may be applied to radar (FD), and FD systems with a long finite impulse response (FIR) channel and a quasi-stable non-linear component.

Adaptive filtering is a common technique to describe the behaviour of a given "black box" system based solely on its inputs and outputs. For example, FIG. 1 illustrates a finite impulse response (FIR) model commonly employed to describe linear finite response systems.

Figure 1:
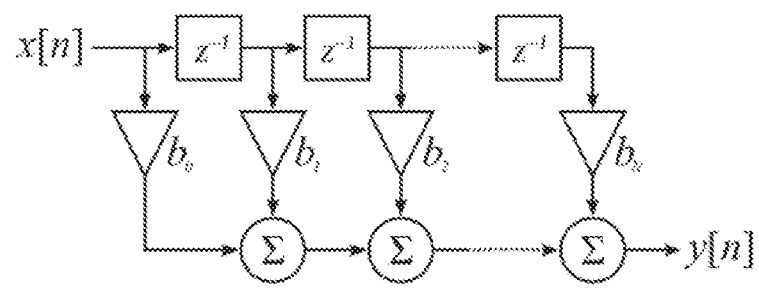
FIG. 1 shows a known finite impulse response model.

As shown in FIG. 1, a series of delay line taps are defined by unit delays denoted as $z^{-1}$ in z transform space. On each tap i, a weight $b_i$ is applied. Thus, the filtered output y[n] of a FIR filter of order N to an input x[n] can be expressed as:

$$y[n] = \sum_{i=0}^{N} b_i x[n-i]$$

The developed model is then utilized to either predict future system output or cancel an unwanted part of the signal, considered as interference. To cite one application which heavily relies on adaptive filtering, full-duplex (FD) communication has recently gained a lot of interest thanks to its promise to double the throughput at no additional bandwidth requirement. Contrarily to traditional transceivers, FD systems allow transmission and reception to take part simultaneously, at the same frequency, and using either the same antenna or different ones. This gain in resources is achieved thanks to an additional processing carried out at the receiver side. Two examples of FD radio transceivers are illustrated in FIG. 2 and FIG. 3.

Figure 2:
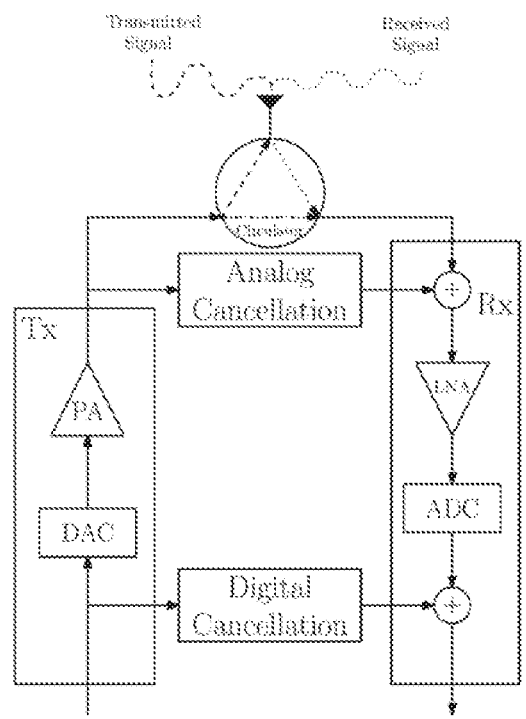
FIG. 2 shows a known FD radio transceiver.
Figure 3:
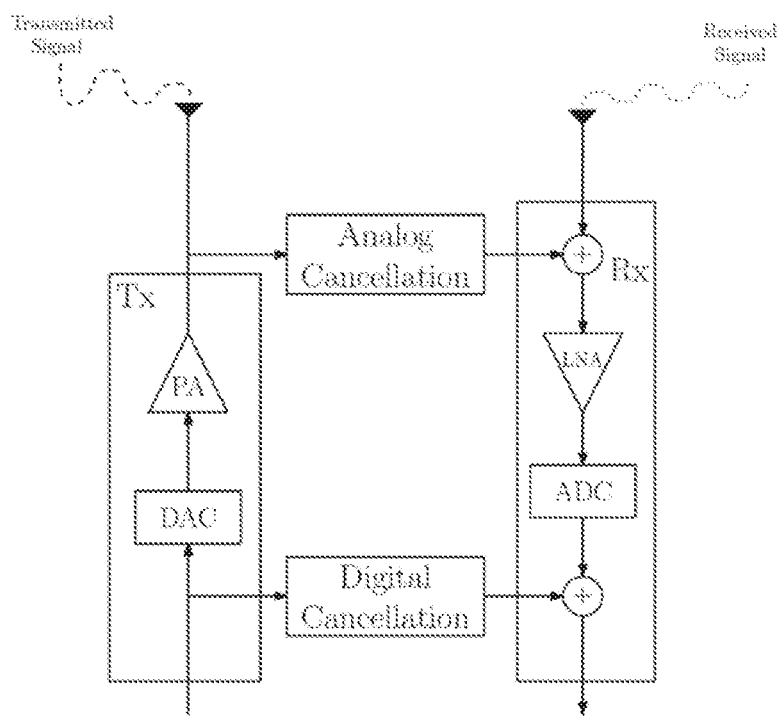
FIG. 3 shows another known FD radio transceiver.

In FIG. 2, a transceiver is provided with a single antenna. This is connected, via a circulator, to the output of a transmitter Tx and the input of a receiver Rx. The input of the receiver Rx receives the antenna signal from the circulator, and sums this to an output of an analog cancellation block which itself feeds from the output of the transmitter Tx. The analog cancellation block cancels part of the strong signal leaking directly from the transmitter to the receiver as well as any delayed multipath versions.

A low-noise amplifier (LNA) obtains this analog cancelled signal and passes an amplified version thereof to an analog to digital converter (ADC). The digital output of the ADC is then summed with a digital cancellation signal, produced by a digital cancellation block, which processes a signal to be transmitted by the transmitter to contribute to the further cancellation of leakage of the transmitted signal, and artefacts thereof, into the received signal.

The transmitter is operable to receive a signal to be transmitted. This signal is, as noted above, also passed to the digital cancellation block. The signal is passed to a digital to analog converter (DAC) which produces an analog signal which is input to a power amplifier (PA) which generates an electrical signal which is sufficiently powerful to cause electromagnetic excitation about the transmit antenna. This amplified signal is passed through the circulator to the antenna, and also to the analog cancellation block noted above.

A transceiver illustrated in FIG. 3 differs from that in FIG. 2 in that two antennas are provided—one for transmitting a signal produced by the transmitter, the other for receiving a signal for processing by the receiver. In all other respects, the two arrangements are broadly the same.

Figure 4A:
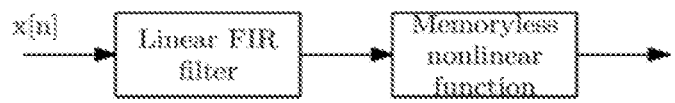
FIG. 4A to 4D show different filter models for a power amplifier.
Figure 4B:
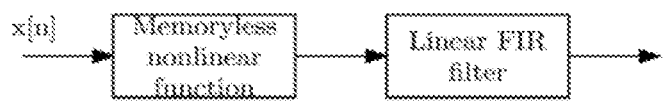
Figure 4C:
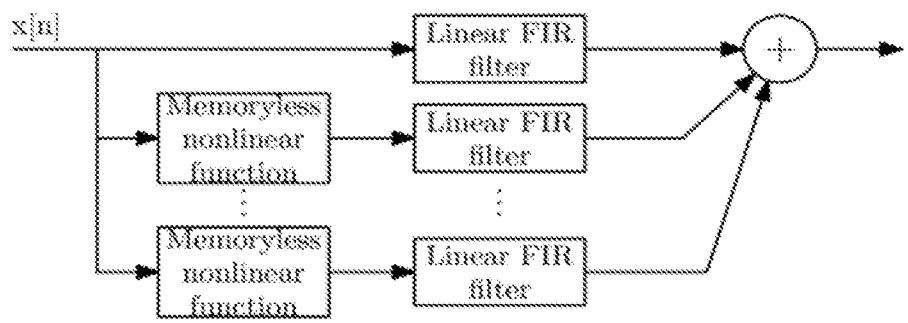
Figure 4D:
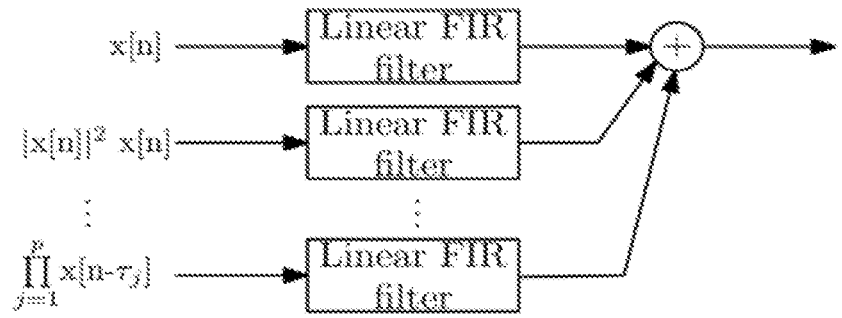

In fact, to detect the wanted weak signal, the receiver accurately estimates and cancels the strong signal leaking directly from the transmitter to the receiver as well as its delayed multipath versions. Different models are proposed to describe the empirical non-linear system defined by the transmitted signal and the unwanted self-interference (SI) signal. Often, the channel is assumed linear while non-linearities are caused mainly by the transmitter power amplifier (PA) or the receiver's low noise amplifier (LNA) operating in their non-linear region. The performance and complexity of the filter depends on the model. As shown in FIG. 4, PA nonlinearities can be estimated using numerous models such as Wiener (FIG. 4A), Hammerstein (FIG. 4B), Volterra (FIG. 4C), or parallel Hammerstein (PH)(FIG. 4D). Although Volterra and PH are more complex, they tend model behaviour of a PA more accurately.

For example, a conventional continuous wave (CW) single antenna weather radar generally operates in separate transmission and reception modes. Although the power of the transmitted signal is high, the received echoes are comparatively low. The receiver is designed accordingly and is turned off during transmission to prevent damaging the electronics. As a result, a conventional CW radar can suffer from a "blind" spot as it cannot detect echoes occurring during transmission. The use of FD techniques in radar applications can contribute to overcoming this issue. Nevertheless, the FIR channel increases as a function of the transmit duration to account for returns occurring during SI. In such an example, having a high order FIR channel in cascade after a non-linear PA, the complexity of the combined FD model can increase considerably.

Figure 5:
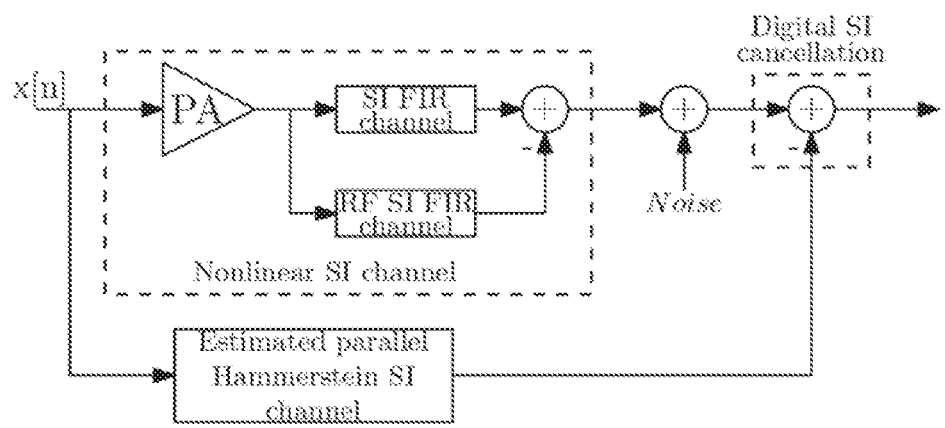
FIG. 5 shows a known transceiver.

FIG. 5 illustrates a conventional canceller structure aimed at cancelling non-linear SI. It models the PA using PH while the multipath channel and RF canceller channel are modelled as two FIR filters. The multipath channel models the delayed multipath echoes while the RF canceller channel models the distortions introduced by the analogue canceller described in FIG. 2 and FIG. 3.

Figure 7:
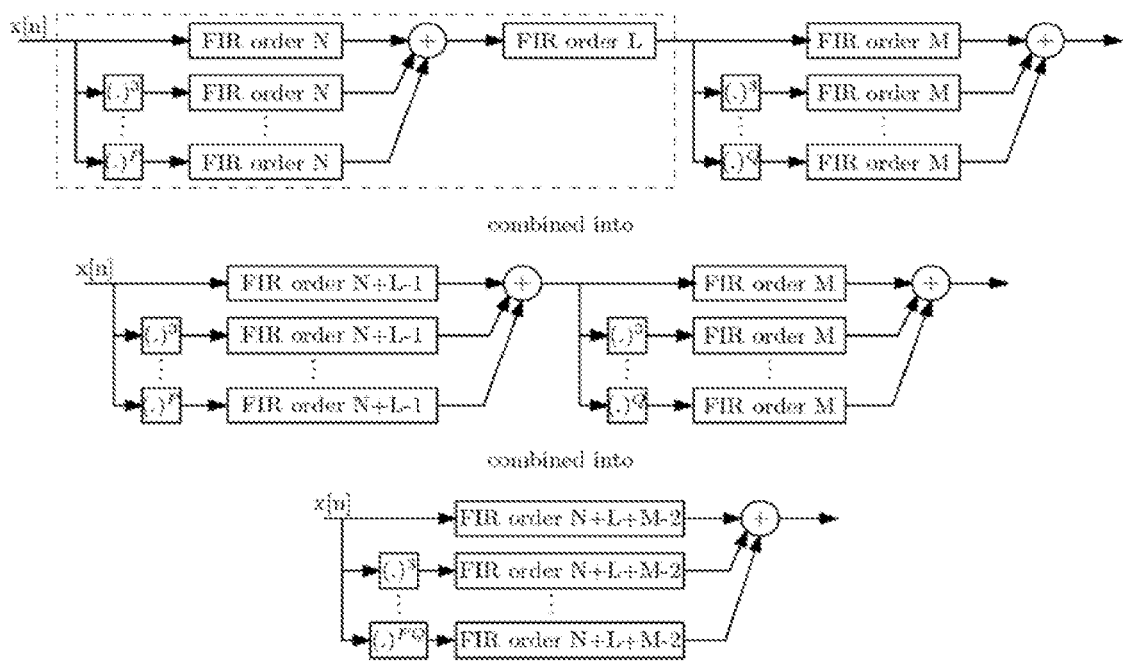
FIG. 7 shows a block diagram of configurations to demonstrate complexity of combined models.

In general, the combined PH and FIR filter results in a new PH model with longer causal and non-causal memory depths at each polynomial branch as depicted in FIG. 7. So, estimating the combined PH model is only practical when the linear FIR channel has small order. Whereas, in applications with long memory, the filter computational complexity rises in a multiplicative manner. For instance, in radar applications, signal reflections can occur at multiple occasions and are still significant even after long delays. Thus, a radar channel is modelled using a long memory FIR filter. In addition, as the scanned environment changes rapidly, the FIR channel changes much faster than the PA model.

The conventional approach combines the non-linear model and linear FIR channel and produces a new complex model with more filter parameters. Hence, it is not suitable for applications with high order FIR channels.

Figure 6:
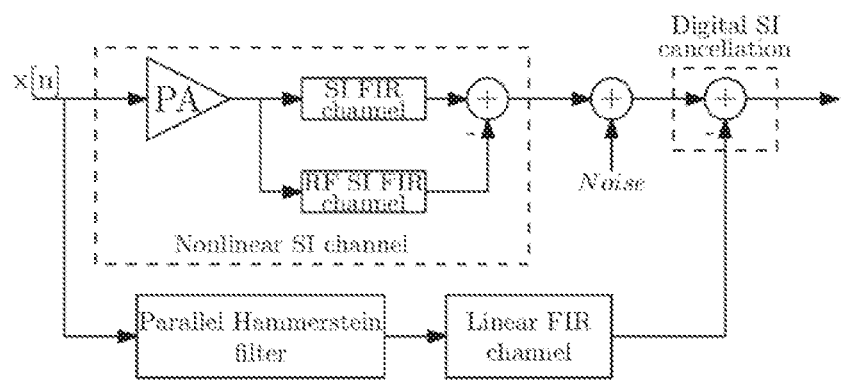
FIG. 6 shows a transceiver of an embodiment.

FIG. 6 illustrates an embodiment, in which each separate model is estimated using an iterative adaptive filter. The iterative adaptive filter comprises, separately, and in series, a parallel Hammerstein filter and a linear FIR filter. The output of the linear FIR filter is a digital SI cancellation signal which can be applied to the digital output of the receive channel to produce an SI cancelled receive signal.

The reader will recognise that the iterative algorithm may lead to a sub-optimum solution due to the limited filter parameters. Nevertheless, it offers a compromise between complexity and filtering performance.

To estimate a multi-component system such as full duplex, the system is divided into its constituent parts and a model is assigned to each entity. Then, the whole system is estimated by combining the cascaded models which often produces a complex overall filter. The embodiment illustrated in FIG. 6 avoids combining cascaded models. Instead, it jointly estimates each model in an iterative manner. This method is advantageous when the FIR channel changes rapidly while the PA's response is quasi-stable.

In fact, combining PH with an FIR channel increases the order of each non-linear PH branch as detailed in FIG. 7. As a result, the number of filter parameters increases in a multiplicative manner while the complexity of some adaptive filtering grows quadratically. In contrast, the number of filter parameters increases linearly when estimating each component linearly.

In case the system contains a third component, for instance a second nonlinear PH model to account for the nonlinear LNA, combining the cascaded system will not only increase the FIR order of each branch but also the number of non-linear branches as shown FIG. 7.

In a system composed of two sub-models such as in FIG. 6, the embodiment requires that the initial point for the adaptive filter estimation of each sub-model is close to the solution. This requirement is applicable when one sub-model varies at slower rate than the other. In such a case, the most recent estimated filter parameters for the quasi-stable model can be used as initial point for the next iteration.

Figure 8:
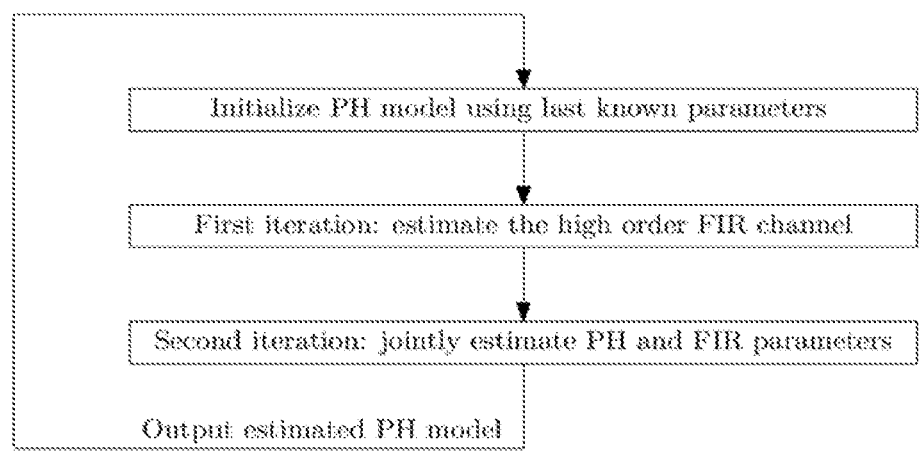
FIG. 8 shows a method in accordance with an embodiment.

For instance, in a radar FD application, the radar channel changes faster than the non-linear PA response. Therefore, in FIG. 8, a flowchart illustrates a method of adaptive filtering in accordance with an embodiment. The method initializes using the recently computed PA filter parameters as an initial point for a first iteration which comprises an early "rough" estimation of the FIR channel. In a second filtering iteration, the adaptive method uses the same data samples to jointly determine the parameters of both filters and produce "refined" estimates of both the non-linear PA and FIR channels. By avoiding the estimation of the combined complex model, the method reduces the number of filter parameters and the computational burden of each step.

Figure 9:
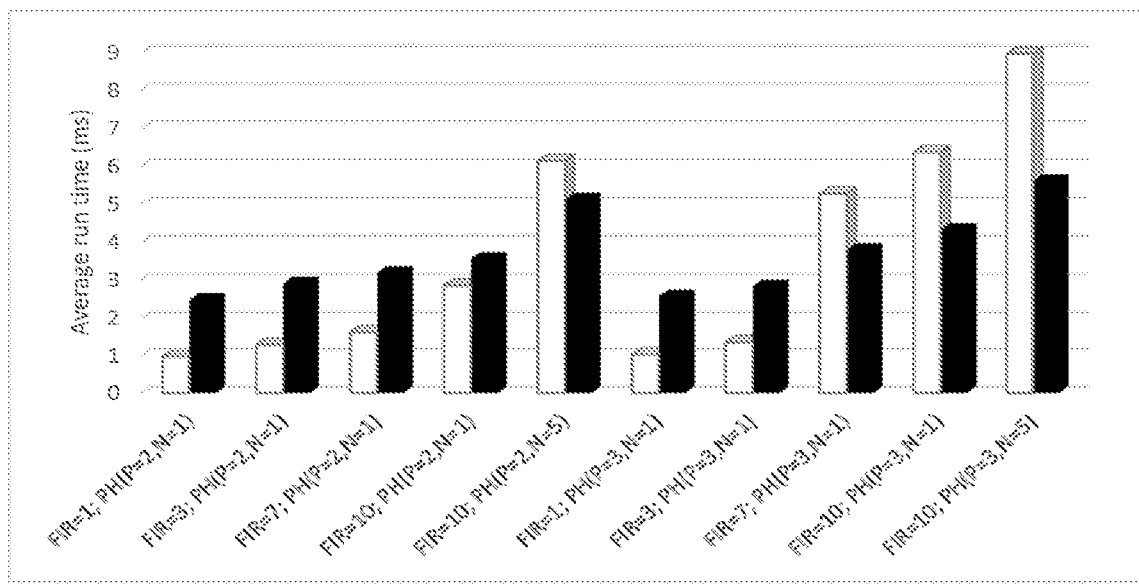
FIG. 9 shows simulation results providing comparison of performance of an embodiment with respect to a known transceiver.

FIG. 9 compares the runtime of the recursive least squares (RLS) adaptive algorithm in filtering a conventional combined model (light columns) and a simulation in accordance with an embodiment (dark columns). In the simulation, a 10% error is generated randomly and added to the known PH filter parameters. When the FIR order is low, it is more convenient to apply the conventional method. However, as the number of nonlinear branches and FIR order increase, the present embodiment becomes more attractive and achieves 30% gain in processing time without loss in estimation performance. The reader will note that, in FD radar, the FIR channel is very long to estimate the random radar return occurring during SI.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless communication apparatus, comprising:
a transmitter configured to transmit a first wireless signal via a frequency band during a period;
a receiver configured to receive a second wireless signal via the frequency band during the period; and
a signal canceller configured to cancel an artefact of the first wireless signal from the second wireless signal for self-interference cancellation, the signal canceller comprising:
a non-linear filter configured by first parameters; and
a linear finite impulse response filter configured by second parameters different from the first parameters and configured to receive a signal from the non-linear filter, and to output a signal for the self-interference cancellation,
wherein the signal canceller is further configured to establish multiple times the second parameters from an initial condition by firstly estimating the second parameters and then jointly estimating multiple times both the first parameters and the second parameters, and the initial condition comprises an estimate of the first parameters based on a performed operation of the wireless communication apparatus.

2. The apparatus of claim 1, further comprising a memory storing the first parameters for future use as the initial condition.

3. The apparatus of claim 1, wherein the non-linear filter comprises a Hammerstein model.

4. The apparatus of claim 3, wherein the Hammerstein model comprises a parallel Hammerstein model.

5. A method comprising:
cancelling an artefact of a first wireless signal from a second wireless signal for self-interference cancellation, wherein the first wireless signal is transmitted via a frequency band during a period, the second wireless signal is received via the frequency band during the period;
establishing multiple times second parameters from an initial condition by firstly estimating the second parameters, wherein a linear finite impulse response filter is configured by the second parameters and configured to receive a signal from a non-linear filter and to output a signal for the self-interference cancellation, the non-linear filter is configured by first parameters different from the second parameters; and then
jointly estimating multiple times both the first parameters and the second parameters, wherein the initial condition comprises an estimate of the first parameters based on a performed operation.

6. The method of claim 5, wherein the initial condition comprises an estimate of the first parameters based on performed operations of a wireless communication apparatus.

7. The method of claim 5, further comprising storing the first parameters for future use as the initial condition.

8. The method of claim 5, wherein the non-linear filter model comprises a Hammerstein model.

9. The method of claim 8, wherein the Hammerstein model comprises a parallel Hammerstein model.

* * * * *